United States Patent [19]

Okubo

[11] 4,290,790
[45] Sep. 22, 1981

[54] FILTER APPARATUS AND FILTER SUPPORT FRAMES

[75] Inventor: Kunio Okubo, Nara, Japan

[73] Assignee: Kabushiki Kaisha Hosokawa Funtai Kogaku Kenkyusho, Osaka, Japan

[21] Appl. No.: 110,701

[22] Filed: Jan. 9, 1980

[51] Int. Cl.³ .................. B01D 46/02; E04B 1/343
[52] U.S. Cl. ..................................... 55/379; 52/653
[58] Field of Search ............... 55/378, 379; 210/483; 248/99, 101; 52/653

[56] References Cited

U.S. PATENT DOCUMENTS

| 1,090,312 | 3/1914 | Lachman | 52/653 |
| 1,096,685 | 5/1914 | Cummings | 52/653 |
| 1,301,259 | 4/1919 | Harris | 52/653 |
| 3,377,783 | 4/1968 | Young | 55/379 |
| 3,747,307 | 7/1973 | Peshina et al. | 55/379 |

FOREIGN PATENT DOCUMENTS 2817737 10/1979 Fed. Rep. of Germany ........ 55/379

Primary Examiner—David L. Lacey
Attorney, Agent, or Firm—Young & Thomspon

[57] ABSTRACT

Filtering apparatus 1 comprises a generally cylindrical lattice frame 6, for supporting a filter bag 3, and an annular support member 13 from which extend rods 12 connected together by channel-shaped straps 14, 24 or 34. The technical problem is to provide a frame for a filter which is compact for transport to the erecting site yet quick and straight-forward to erect. Cut-outs 18 are formed in the side walls 14b of the straps 14, 24 or 34 and the support member 13 is fashioned from a flat strip of material. For transport the rods 12 are located in the cut-outs 18 and spot-welded to the straps 14, 24 or 34 and to support member 13 while the straps 14, 24 or 34 and the support member 13 are laid out flat; several such flat assemblages may then be stacked on one another. At the erecting site the support member 13 and straps 14, 24 or 34 are bent round into shape, the straps 14, 24 or 34 being bent in the region of each cut-out 18 so as to deform each cut-out 18 to retain the corresponding rod 12 therein.

14 Claims, 12 Drawing Figures

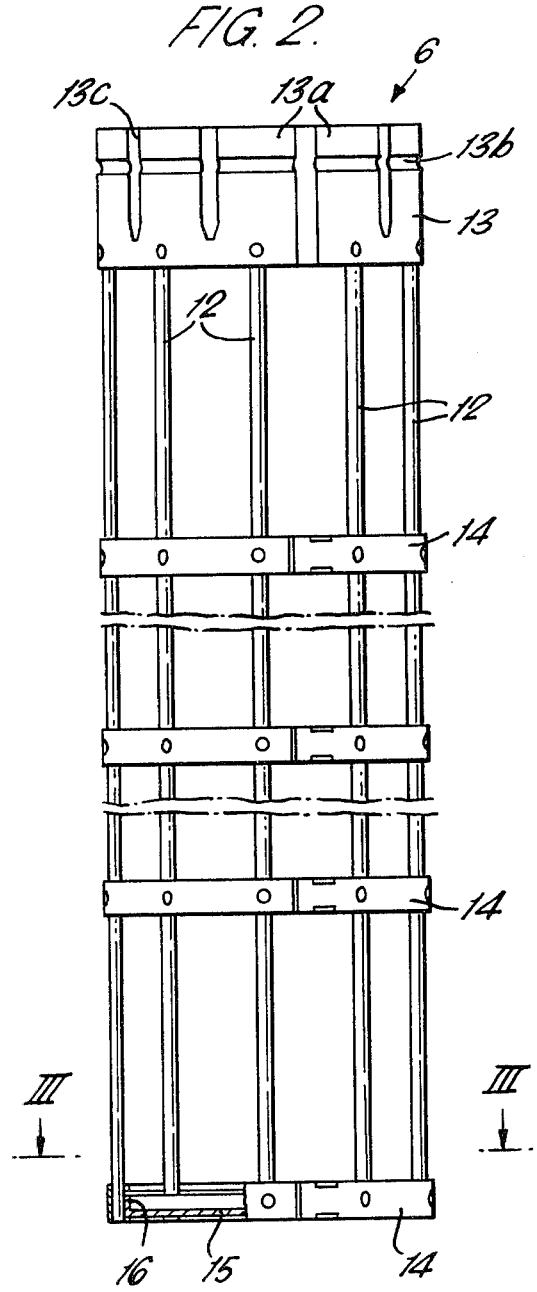

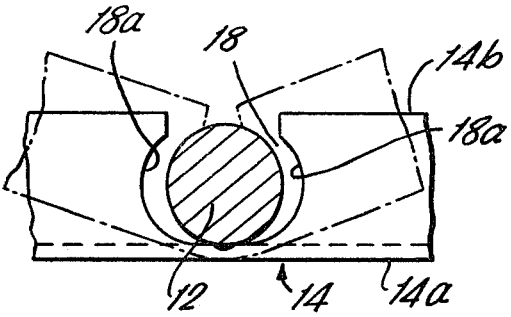
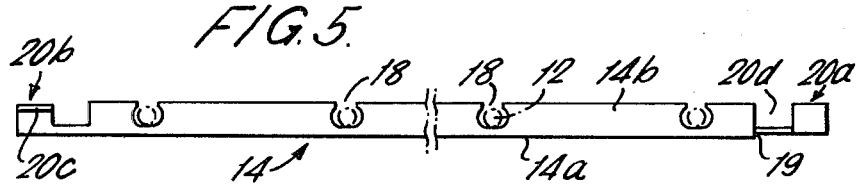
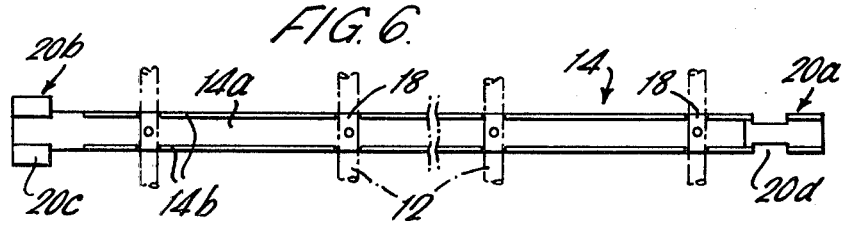
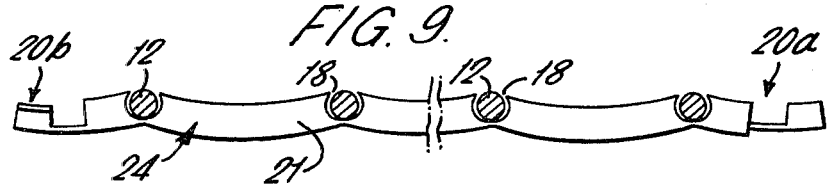
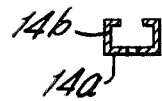
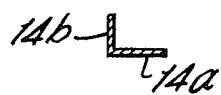

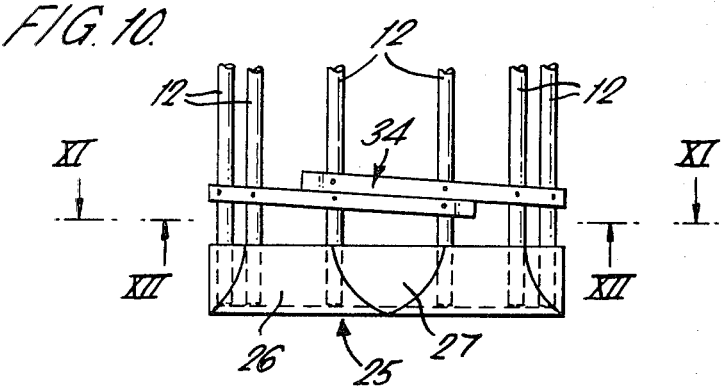
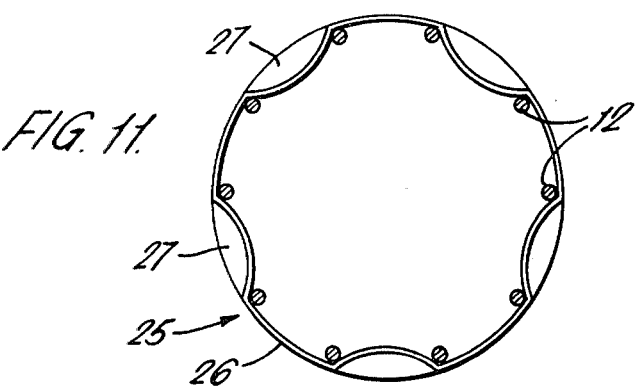
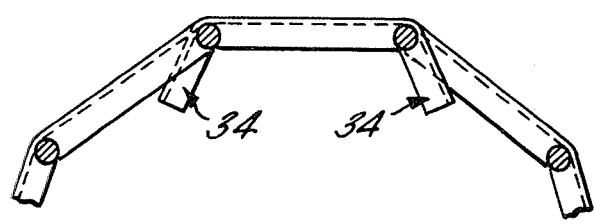

FILTER APPARATUS AND FILTER SUPPORT FRAMES

This invention relates to frames for supporting filter elements in filtering apparatus, and to such filtering apparatus.

A known type of frame for supporting a filter element comprises a number of rods arranged in circular fashion in parallel and with equal separation, an annular support member welded to the top portion of these rods and an annular bottom cap welded to the bottom end, while annular straps are fitted in at suitable locations in the intermediate region between the support member and bottom cap and welded to the rods.

Since, in the case of this known type of invention, a cylindrical shape is formed by welding each of the members together, several such frames cannot be piled up in layers, with the result that they are very bulky and can only be transported in small quantities.

The invention provides a frame for supporting a filter element, the frame comprising a support member, a plurality of rods extending from the support member and secured thereto, and at least one strap connecting the rods together, said strap having a base part to which is secured each rod, and at least one side wall which projects from the base part, said side wall being formed with a cut out for each rod for retaining that rod therein, the arrangement being such that in an unassembled condition the frame is generally flat with the support member and said strap generally straight and in an assembled condition said strap is bent until its ends meet or overlap to form a generally tubular frame in which each rod is substantially enclosed in a cut-out of said strap.

An embodiment of the invention and some modification thereto will now be described, by way of example, to the accompanying drawings, in which:

FIG. 2 is a partially sectional elevation of one form of lattice frame embodying the invention;

FIG. 4 is a diagrammatical view showing the deformation of a cut-out of a strap when the strap is bent into position;

FIG. 5 is a plan view of one form of strap before assembly.

FIG. 6 is a side view of the strap in FIG. 5;

FIGS. 7 and 8 are cross-sectional views of two alternative forms of straps;

FIG. 9 is a view corresponding to FIG. 5 but showing a modified form of strap;

FIG. 10 is an elevation showing an alternative form of end cup and a further modified form of strap;

FIG. 11 is a sectional view taken along the line XI—XI of FIG. 10, and

FIG. 12 is a view corresponding to FIG. 3 but taken along the line XII—XII of FIG. 10.

Figure 1:
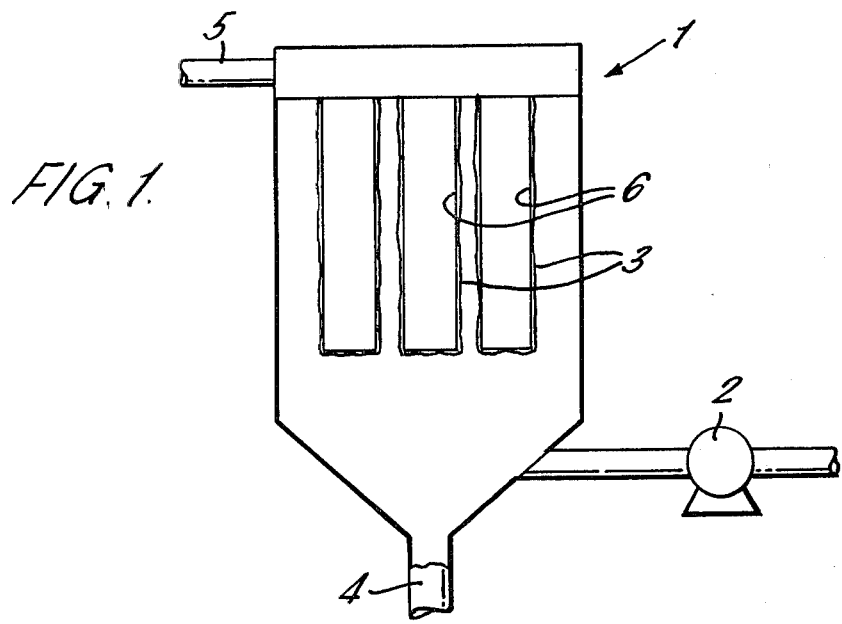
FIG. 1 is an explanatory sketch of a filtering and dust-collecting apparatus which may embody the invention.

Filtering and dust-collecting apparatus 1 shown in FIG. 1 is constructed such that dust-laden gas supplied through a duct and exhaust pump 2 passes through a filter material such as filter cloth or filter paper in the form of filter bags 3 so that the dust is captured and separated into a dust collection passage 4 and the filtered gas is exhausted into a clean gas passage 5. The filter bags 3 are supported by fitting around lattice frames 6 whose upper ends are mounted on the frame of the filtering apparatus.

Referring first to FIGS. 2 to 6, each lattice frame 6 comprises a number of rods 12 and an annular support member 13 having welded thereto with equal spacings the top ends of the rods 12 so as to give the frame a cylindrical configuration. The rods 12 are welded to each of a plurality of straps 14, and to a circular end cap 15 supported by the strap 14 at the bottom end of rods 12. The numbers of the rods 12 and straps 14 are suitably selected in accordance with the size and proportions of the frame. The welding of the support member 13 and straps 14 to the rods 12 is performed by spot welding.

The support member 13 has an annular recessed portion 13b and is formed by press-working sheet material having two ends 13a and at least one cut-out slot 13c. The cut-out slots 13c are provided to facilitate bending of such sheet material into an annular shape. The annular recessed portion 13b is formed to be engaged by a fixing band or the like for securing the filter bag 3 to the frame 6. Such a fixing band also serves to retain the support member 13 in its annular shape.

As shown in FIG. 5, the straps 14 may be formed of channel-shaped material, the channel having a base 14a to which the rods 12 are welded, and side walls 14b projecting one from each side of the base 14a. Cut-outs 18 are formed at equal intervals in these side walls 14b. When, as in FIG. 5, the straps 14 are opened out, a rod 12 may be located in each of these cut-outs 18 as shown in FIG. 3 but arcuate inner surfaces 18a of each cut-out 18 do not contact the rod 12.

Figure 3:
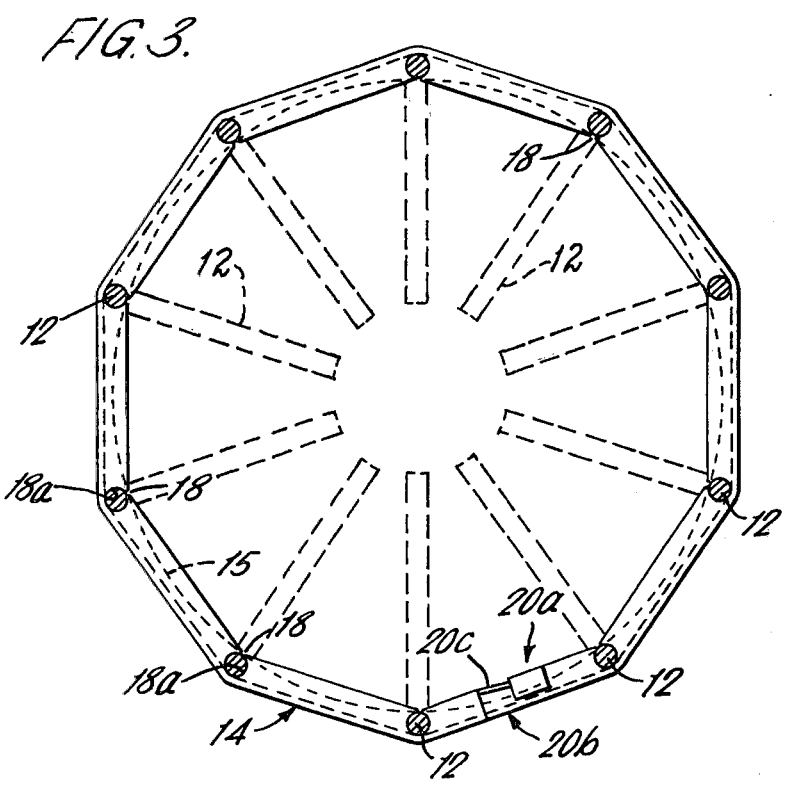
FIG. 3 is a sectional view along the line III—III of FIG. 2.

Each strap 14 is spot-welded to each rod 12 and when the portions of a strap on both sides of a rod 12 are bent as shown by the chain-dot lines of FIG. 3, the rod 12 is retained between the inner surfaces 18a. When the bending of a strap 14 is completed, it forms a polygonal shape which is generally circular, as shown in FIG. 3, so that even when it is subjected to pressure from the filter material, each rod 12 does not separate from the strap 14 due to the weld and engagement of the inside surfaces 18a. Even if the weld should fail, separation is prevented by the inside surfaces 18a alone.

The two ends of each strap 14 are respectively formed with junction parts 20a and 20b, so that by bending the strap 14 as shown in FIG. 3 the junction parts 20a and 20b can be made to approach each other so that they can be joined. The junction part 20a is a male part which is formed with a step 19 corresponding to the thickness of the base 14a of the strap 14. The junction part 20b is a female part which fits the male junction part 20a by elements 20c engaging cut-outs 20d. As shown in FIG. 3, the base 14a in the neighbourhood of the two parts forms a single level surface due to the provision of the step 19 in the junction part 20a.

The straps 14 may be alternatively formed from material with another cross-section, for example that shown in FIG. 7 or that shown in FIG. 8.

Each strap 14 may be formed by punching the cut-outs 18 and 20d in a flat sheet then forming the channel-shape by a pressing operation.

A modified form of strap is shown at 24 in FIG. 9 in which portions 21 of strap 24 between the cut-outs 18 are arcuate so that when the straps 24 are bent round into position they take up a circular configuration. The continuous arcuate straps 24 are preferably in that they are less likely to damage the filter bag because of this circular configuration.

Instead of being formed with junction parts 20a and 20b, the ends of each strap 14 or 24 may be butt-welded together in situ when assembly is carried out.

A further modified form of strap is shown at 34 in FIGS. 10 and 12. This strap 34 is of channel-shape as before but is not formed with junction parts. The ends of the strap 34 are not joined together but overlap each other by two rods 12 as shown.

The end cap 15 is provided to prevent the filter material from being forced into the bottom of the frame 6 due to the gas pressure. A flange 16 is provided on the circular periphery of the cap 15, which, when the frame 6 is assembled into the cylindrical configuration, is held on the frame 6 by the flange 16 fitting between the inside walls 14b of the lowermost strap 14, 24 or 34.

FIGS. 10 and 11 show an alternative form of end cup at 25 which obviates the need for a strap at the end of the frame. The cup 25 is circular and has a peripheral flange 26 indented at 27 with regular intervals. The cup 25 is held on the frame 6 purely by frictional force against the rods 12. It is therefore important to position a strap 14, 24 or 34 near the cup 25 to induce the requisite spring action of the rods 12. This form of end cup 25 facilitates quick and easy mounting on the frame 6.

The end cap may be dispensed with and instead the lower portions of the wire rods 12 may be bent in a right angled direction so that when the frame 6 is assembled, they extend towards the middle of the cylinder, as shown in phantom lines in FIG. 3. In this case the strap 14, 24 or 34 at the end of the frame 6 may be dispensed with.

In the assembly of the frame 6 the support member 13 is laid out flat and the straps 14, 24 or 34 are arranged substantially in parallel in a flat condition similar to FIG. 5. The predetermined number of wire rods 12 are then inserted into the cut-outs 18 of the straps and their upper ends laid against the support member 13. The rods 12 are then spot-welded to the support member 13 and the straps. During this process, since the support member 13 and the straps are laid out flat, welding at a plurality of welding locations can be carried out simultaneously.

As the frame 6 is thus manufactured in an opened-out condition, such frames can be transported flat, piled up in layers, to the location where they are to be assembled with the filtering and dust-collecting apparatus 1. At the assembly site, the frame 6 is bent as shown in FIG. 3 or FIG. 12, while fitting the end cap 15 into the lowest strap, or, if the end cap 25 is used, mounting the end cap on the frame afterwards. The junction parts 20a, where applicable, are brought up to and fitted into the junction parts 20b for each strap and the engagement elements 20c bent over into the cut-outs 20d to join the two junction parts 20a and 20b, thus assembling the frame 6 into the cylindrical shape.

If there is no end cap and the lower portions of the rods 12 are bent at right angles as described before, the frames may still be stacked opened out for transportation.

The embodiments of the invention described above exhibit the following advantages. Since the wire rods are welded to the straps and the mounting fitting while these are opened out, the welding operation can be carried out in a simple and efficient manner. When they are in this opened-out state, a large number of frames can be transported piled up on top of each other in layers and can be simply and rapidly assembled on site into the cylindrical configuration. When the frames are assembled, the inside faces of the cut-outs surround the rods so that the straps firmly reinforce the rods, and even if a weld fails, the rods are still held in position.

Although this invention has been described in relation to frames for filters in filtering and dust-collecting apparatus, it can be applied to other uses, such as for example reinforcing steel frames for engineering constructions.

I claim:

1. A frame for supporting a filter element, the frame comprising a support member, a plurality of rods extending from the support member and secured thereto, and at least one strap connecting the rods together, said at least one strap having a base part to which is secured each rod, and at least one side wall which projects from the base part, said at least one side wall being formed with a cut-out for each rod for retaining that rod therein such that said frame is generally flat with the support member and said at least one strap generally straight when in an unassembled condition and said support member is bent and said at least one strap is bent in the region of each cut-out until its ends meet or overlap, so that each cut-out is deformed, to form a generally tubular frame in which each of said rods is substantially enclosed in one of said cut-outs of said at least one strap when in an assembled condition.

2. A frame as claimed in claim 1 in which said at least one side wall comprises two side walls positioned with respect to each other such that said at least one strap is generally channel-shaped.

3. A frame as claimed in claim 1 in which said at least one strap comprises a plurality of straps spaced axially along the rods.

4. A frame as claimed in claim 1 in which said frame is formed of metal and in which the rods are secured to the support member and to the at least one strap by spot welding.

5. A frame as claimed in claim 1, further comprising an end cap at the opposite end to the support member.

6. A frame as claimed in claim 5, wherein said at least one strap comprises a strap located at the opposite end and end cap is retained within said strap.

7. A frame as claimed in claim 5, wherein said at least one strap comprises a strap located at the opposite end and the end cap is formed with indentations and is retained on the frame by spring force of the rods which are located in the indentations, said strap adjacent the end cap being spaced from the end cap by a distance such that the spring force of the rods is sufficient to retain the end cap.

8. A frame as claimed in claim 1, in which an end portion of each rod remote from the support member is bent substantially at right angles so that when the frame is in the assembled condition the end portion of each rod projects inwardly.

9. A frame as claimed in claim 1, in which the rods are solid cylindrical bars and the cut-outs are arcuate so as to grip the rods when the frame is in the assembled condition.

10. A frame as claimed in claim 1 in which the support member is formed from a piece of sheet material having a series of slots to facilitate bending into the annular shape.

11. A frame as claimed in claim 1, in which the ends of said at least one strap have releasable connecting means for connecting said ends together.

12. Filtering apparatus comprising at least one frame as claimed in claim 1 and a filter element mounted on the said at least one frame.

13. Filtering apparatus as claimed in claim 12 in which the filter element is provided in the form of a bag which fits over and around the said at least one frame.

14. Filtering apparatus as claimed in claim 13 in which the support member is formed with a groove to receive a band for gripping the bag against and in the groove.

* * * * *